United States Patent [19]

Lynch et al.

[11] Patent Number: 4,636,393

[45] Date of Patent: Jan. 13, 1987

[54] METHOD OF PROCESSING MEAT FOR INCLUSION IN HIGH ACID TYPE FOODS AND PRODUCT THEREOF

[75] Inventors: Donald J. Lynch, Haverford, Pa.; Raymond P. Shivers, Gibbstown, N.J.

[73] Assignee: Campbell Soup Company, Camden, N.J.

[21] Appl. No.: 675,852

[22] Filed: Nov. 28, 1984

[51] Int. Cl.⁴ .............................................. A23L 1/317
[52] U.S. Cl. ................................... 426/276; 426/332; 426/589; 426/646
[58] Field of Search ................ 426/276, 332, 589, 646

[56] References Cited

U.S. PATENT DOCUMENTS

| | | |
|---|---|---|
| 2,434,388 | 1/1948 | Brehm . |
| 3,328,178 | 6/1967 | Alderton . |
| 3,503,756 | 3/1970 | Wistreich . |
| 3,692,534 | 9/1972 | Ueno et al. . |
| 3,863,015 | 1/1975 | Kanda ................. 426/276 |
| 3,886,296 | 5/1975 | Brooks et al. ........ 426/325 |
| 3,985,904 | 10/1976 | Bernotavicz ........ 426/332 |
| 4,145,451 | 3/1979 | Oles ...................... 426/321 |
| 4,262,027 | 4/1981 | Tonner et al. ........ 426/325 |
| 4,439,456 | 3/1984 | Kammuri et al. .... 426/276 |
| 4,447,461 | 5/1984 | Loos et al. ............ 426/589 |
| 4,472,448 | 9/1984 | Haggerty et al. .... 426/589 |

FOREIGN PATENT DOCUMENTS 42861 10/1977 Japan ................................. 426/276

Primary Examiner—Arthur L. Corbin
Attorney, Agent, or Firm—Banner, Birch, McKie and Beckett

[57] ABSTRACT

A process for preparing acidified meat chunks suitable for inclusion into a high acid liquid food product is described. A meat paste is extruded into discrete agglomerates which are dropped into a suitable coagulating bath. The agglomerates then are cooked and acidified by submersion in a hot acid bath.

20 Claims, No Drawings

METHOD OF PROCESSING MEAT FOR INCLUSION IN HIGH ACID TYPE FOODS AND PRODUCT THEREOF

BACKGROUND OF THE INVENTION

1. Field of the Invention

The present invention broadly relates to a method for preparing a meat product which not only renders it biologically stable but also organoleptically similar to freshly cooked meat chunks. The present invention particularly relates to a method for preparing an acidified meat product suitable for inclusion in heat-treated, though not sterilized, high acid liquid foods such as sauces, gravies and the like.

2. Description of the Prior Art

The majority of canned food products are sterilized by retorting the canned product at high temperatures. In this context, the term "sterilized" means that microorganisms which may pose a health hazzard, including spores which may cause spoilage, under normal nonrefrigerated storage conditions have been eradicated. Retorting involves heating a sealed container of the food product, in accordance with a well-defined time-temperature history, for a sufficient time to destroy (kill) all microbial material, particularly those pathogenic and toxin-forming microorganisms which potentially could flourish under the canned product's normal storage conditions. With proper treatment, such products can remain at room temperature substantially indefinitely without being spoiled or contaminated by microbial activity.

Some food products, however, undergo noticeable and undesirable organoleptic degradation when exposed to the severe heat processing conditions necessary to render the canned product biologically sterile. Included within this class of food products are certain pectin-containing foods, particularly tomato-based products including spaghetti sauce, taco sauce, chili sauce and the like.

Fortuitously. heat processing conditions required to produce a biologically acceptable product are known to vary with the food product's pH. For example, it is well known that food products having a low pH, below about 4.2 to 4.6, typically referred to as high acid foods, need only a mild heat treatment in order to obtain a biologically stable product, since acid-tolerant organisms responsible for food spoilage such as yeast and molds generally have a low temperature threshold. The tomato-based products mentioned above fall into the category of high acid foods. Other organisms, including spores, responsible for food spoilage and food borne illness which are only destroyed by a more severe temperature treatment, such as *Clostridium botulinum* and *Bacillus coagulans,* cannot germinate or grow in the low pH environment prevailing in such high acid foods. It is possible therefore to preserve the organoleptic quality of a high acid food product without sacrificing consumer safety by avoiding the severe heat treatment needed to destroy such heat resistant organisms and instead rely on the high acidity of the food product to insure biological stability by preventing spore germination and growth.

Based on this understanding, the prior art has developed a process wherein such high acid food products are heat treated under conditions which destroy acid-tolerant organisms and then the heated material is packaged before it cools. With this process the need to retort the packaged (canned) product is avoided. According to this technology, the high acid food, such as a spaghetti sauce, is thermally processed at a high enough temperature and for a period of time long enough to destroy acid-resistant organisms using heat exchanger equipment well known in the food processing industry. Typically, such products are heated to a temperature of about 190° to 205° F. The hot heat-treated product then is filled into a previously cleaned container under clean, though not biologically sterile, conditions. The container filled with the hot product is sealed and passed through a steam chamber so as to retard cooling of the hot-filled product for a short time period, long enough to ensure that all acid-resistant microbes are destroyed, typically about 3 minutes. The container then is cooled to yield a product suitable for marketing.

One disadvantage associated with these hot-filled, high acid liquid food products is that it is difficult to incorporate other low-acid and medium-acid solid food additives such as meat into the packaged product. The inclusion of such materials into the product tends to increase the overall pH of the packaged product making both the product and the additives prone to contamination and spoilage by heat-resistant organisms such as *Clostridium botulinum* and *Bacillus coagulans.*

U.S. Pat. No. 3,886,296 describes a process for including low-acid and medium-acid foods in a high-acid food product. According to the disclosed technique, the low-acid or medium-acid food, including meat, spaghetti and vegetables having a thickness of no more than about 0.5 inch, is subjected to a high temperature, acid blanch for a short time period so as to reduce the pH of the food to below about 5.0. The acid blanched food then is immersed in an acidic liquid phase such as a sauce or gravy having a pH below 4.5. Generally, the liquid phase is at an elevated temperature, e.g., on the order of 160°–212° F. The combined product is sealed in a container and then is heat processed at relatively low temperatures for short periods of time, for example on the order of about 10–15 minutes at or below 212° F. (mild retort). The patent discloses that due to the acid blanching of the food and the fact that the food is submerged in an acidic liquid phase, the food particles acquire an overall pH of 4.5 or below within about 30 minutes after the food particles and the acidic liquid phase are combined.

The process of U.S. Pat. No. 3,886,296 typically is not suitable for acidification of meat chunks, i.e., meat pieces having a dimension of about 0.5 inch or larger, to a pH below about 4.6, since acidification from the acid blanch is a relatively slow process limited by the rate of hydronium ion diffusion into the meat. Such diffusion is influenced by both the size and physical characteristics of the meat. The art has recognized, see U.S. Pat. No. 4,262,027, that unless the meat particles are small in size, it is difficult to obtain a uniform distribution of acid throughout the meat. U.S. Pat. No. 4,262,027 itself attempts to remedy this problem by forming a meat emulsion containing an acidogen which reduces the pH of the emulsion when it is cooked by forming an acid in situ so as to produce the desired acidified meat product. Notably, both U.S. Pat. Nos. 3,886,296 and 4,262,027 only disclose using the acidified food product in a canned product that is subsequently retorted, even though the retorting is done under a mild time-temperature history.

It is an object of the present invention to provide a process for preparing an acidified meat product suitable for inclusion in a heat treated, though not retorted and sterilized, high acid-type liquid product such as sauce, gravy and the like.

It is another object of the present invention to provide a process for preparing a uniquely structured acidified meat product that is organoleptically similar to freshly cooked meat chunks.

These and other objects of the present invention will become apparent from a consideration of the specification and appended claims.

SUMMARY OF THE INVENTION

The present invention relates to a process for preparing acidified meat agglomerates comprising:

(a) grinding meat in the presence of added protein solubilizing salt to produce a meat paste;

(b) extruding discrete agglomerates of the meat paste into a hot aqueous protein denaturing bath so as to coagulate at least the surface proteins of said discrete agglomerates; and (c) soaking the surface-coagulated agglomerates in a hot aqueous bath containing an edible acid for a time sufficient to permeate the agglomerates with the acid, said acid bath containing a sufficient concentration of acid for reducing the pH of said agglomerates to less than about 4.6.

The present invention further relates to a process for preparing acidified meat agglomerates having the appearance of freshly cooked meat chunks comprising:

(a) grinding meat in the presence of added protein-solubilizing salt to produce a meat paste;

(b) forming discrete agglomerates of the meat paste by extrusion;

(c) dropping said extruded agglomerates into a hot aqueous protein denaturing bath so as to coagulate at least the surface proteins of said discrete agglomerates and fix said agglomerates in the shape created by impacting the denaturing bath; and (d) soaking the surface-coagulated agglomerates in a hot aqueous bath containing an edible acid for a time sufficient to permeate the agglomerates with the acid, said acid bath containing a sufficient concentration of acid for reducing the pH of said agglomerates to less than about 4.6.

In still another aspect, the present invention pertains to a shelf stable, heat treated, though not sterilized, tomato-based liquid food product having a pH of less than about 4.6 comprising an acidic tomato-based liquid phase and the acidified meat agglomerates of the present invention.

DETAILED DESCRIPTION OF THE PREFERRED EMBODIMENTS

The present invention relates to an improved process for preparing acidified, agglomerated meat chunks which are organoleptically similar to freshly cooked meat chunks. The meat chunks of the present invention are suitable for inclusion in hot-filled, high-acid liquid food products such as sauces, gravies and the like. The process of the present invention is able to produce acidified meat chunks having the size, appearance and texture of freshly cooked meat chunks.

As used throughout the specification and claims, the term "acidified" means that the meat product has a pH of less than about 4.6, preferably less than 4.1 and most preferably about 3.9. The pH of the meat is measured by washing excess acid from a small sample (e.g., about 50 gm) of the meat agglomerates; vigorously shearing the meat in an equal mass of distilled water, using for example a Waring blender or equivalent device to obtain a smooth liquid sample and then measuring the pH of the liquid sample using any standard pH measuring technique. Also as used herein, the terms "agglomerate", "agglomerated", "agglomeration", and the like refer to a process for making large meat chunks from small ground meat pieces by extrusion as well as to the resulting product formed by bonding the small pieces of meat into larger chunks via extrusion.

In carrying out the process of the present invention, a meat paste initially is prepared from fresh or frozen meat pieces by grinding or chopping. The size of the meat pieces initially subjected to the grinding (comminution) step is limited only by the capacity or capability of the grinding or chopping equipment employed. Also, the edible tissue or meat of any animal can be used as the meat source. In particular, edible animal tissue can be obtained from a variety of mammals, such as cattle, pigs and lambs, as well as from fowl and fish. As will become more apparent hereafter, applicants have observed that veal, which is the meat of a young calf, exhibits different processing characteristics than beef, which is the meat of an adult bovine. As a result, applicants in the context of this invention consider these materials as separate species of the generic category of meats. The meat is ground, i.e., chopped or comminuted, preferably without added water. Preferably, the meat is at least reduced to a size within the range of about 1/16 inch to ⅛ inch in maximum dimension. The meat may be chopped in one or more steps using conventional procedures and equipment, such as in an auger-type grinder.

Typically, after initial rough grinding (e.g., to a particle size of about ⅛ inch to ¾ inch), a protein solubilizing salt is added to the meat, the mixture is blended and reground to facilitate uniform blending of the salt with the meat and to expose more meat muscle to the salt. If desired some or all of the salt could be added during the initial step of grinding. The addition of salt to the chopped meat serves to solubilize salt-soluble muscle protein, e.g., myosin, which functions as a binder in the present invention. Sufficient salt is added to the meat to solubilize enough protein binder to yield a firm product after subsequent treatment. Typically, salt is added in an amount between about 1% and about 6% by weight of the meat.

Salts which may be used in the present invention would include any organic or inorganic acid salt commonly used in foodstuffs which has a protein solubilizing effect. Sodium chloride is preferred because of its cost and availability. A combination of salts may also be advantageous in certain circumstances. For example, in some cases, such as when employing beef as the source of meat, sodium tripolyphosphate is a preferred additive. Sodium tripolyphosphate acts synergistically with the added sodium chloride to improve the binding effect of the salt-soluble proteins. While applicants have found that suitable agglomerates can be prepared from veal using sodium chloride as the only salt additive, in the case of beef, sodium tripolyphosphate is also preferably added in order to produce a similar degree of bonding as obtained with veal. When used as an additive, sodium tripolyphosphate generally is included in an amount between about 0.1 and about 1.0 percent by weight of the meat, generally not more than about 0.5 percent by weight.

If desired, other additives commonly used in meat products may also be added to the meat paste. Such additives include, for example, ice, spices, antioxidants, a source of vegetable protein such as soy protein isolate and other binders such as egg whites and bread crumbs.

After chopping the meat into small pieces in the presence of the added salt, the prepared paste is allowed to stand for a time sufficient to solubilize the salt-soluble proteins in the meat. Typically, this takes anywhere from about ½ to 1½ hours.

In accordance with the present invention, the meat paste prepared as described above then is formed into larger sized agglomerates by extrusion, preferably having a thickness of about 0.5 inch or greater. Typically, a distribution of agglomerates within the range of ¼ to 1¼ inch in size is desired, i.e., the desired agglomerates will pass through a screen having about a 1.25 inch opening but will be retained on a screen having an opening of less than about 0.25 inch. The paste is formed into agglomerates of the desired size using a commercially available pressure applying extrusion device. Preferably the extrusion device includes a pump which feeds the meat paste to a multi-orifice extrusion die or die plate. For example, a die plate about ½ inch in thickness having multiple orifices each having about a ½ inch in diameter with a center-to-center spacing between neighboring orifices of about ¾ inch has proved to be suitable. At the inlet face of the die plate a rapidly rotating blade is positioned for rotation about ⅛ inch from the die surface. The die plate and blade are provided with suitable ports to permit steam injection into the region at the inlet face of the die plate. An extrusion device of this type found by applicants to be particularly suitable is available from the Marlen Research Company, 9201 Bond Street, Overland Park, Kans., Model No. 300 Marlen Grinder with Speco jet knife assembly.

With this equipment, the size of the agglomerates formed is influenced inter alia by the rate meat is fed to the die plate, the rotational speed of the extruder's blade, steam pressure if used, and the design of the die plate. Suitable operating parameters for producing agglomerates of the desired characteristics can be obtained using routine experimentation.

In another embodiment, steam injection into the inlet region of the extrusion die also helps to insure that agglomerates of a proper size are formed by the extruder. The steam is injected in a manner to completely permeate the inlet region of the device. As will be shown in a subsequent example applicants have found that when extruding a beef paste which includes a combination of sodium chloride and sodium tripolyphosphate as the protein solubilizing salt additives, steam injection is important to insure that a properly sized agglomerate is formed at the extrusion die. Steam injection is not needed when extruding a veal paste in which no sodium tripolyphosphate has been used. Although not wishing to be bound by any particular theory, applicants believe that the injected steam provides a physical segmenting function and may also help to initiate the denaturation of surface proteins of the agglomerates formed.

In order to produce agglomerates having the desired shape and size of fresh meat pieces, the extruded meat paste is dropped into a hot aqueous protein denaturing or coagulating bath. Dropping the extruded pieces into the denaturing (coagulating) bath causes the agglomerates to attain various shapes which approximate the varied shapes obtained by chopping and cooking fresh meat having a size distribution within the range of about 0.25 to about 1.25 inch chunks. The extruded meat agglomerates should be dropped from a height sufficient to more or less randomly deform the meat agglomerates upon entry into the bath. The height, however, should not be so great as to cause substantial damage or destruction of the extruded agglomerates. Applicants have found that to produce agglomerates of a desired shape and size dropping the extruded agglomerates from a height of about 25 inches is suitable. Typically, a height between about 20 and about 50 inches will provide the desired result.

The hot aqueous protein denaturing (coagulating) bath may comprise an aqueous solution of a protein denaturing agent. In the broad practice of the present invention, any of a wide variety of protein denaturing agents can be used in this bath including inter alia an aqueous solution of an alum, an aqueous solution of ethyl alcohol or an aqueous acid solution. In fact, even boiling water can be used. Suitable concentrations for a chemical denaturing (coagulating) bath will appear to those skilled in the art, see for example U.S. Pat. No. 4,439,456. Preferably, an aqueous acid solution maintained substantially at its boiling point is used as the denaturing (coagulating) bath. The strength and temperature of the denaturing (coagulating) bath is adjusted so that the bath rapidly fixes the shape and structure of the meat agglomerates assumed upon entry into the bath.

According to the present invention, the meat agglomerates then are cooked and simultaneously acidified to an equilibrium pH at least below about 4.6. Preferably, the agglomerates are acidified to a pH below about 4.1 and most preferably to about 3.9. Suitable conditions for acidifying and cooking the meat pieces will be apparent to one skilled in the art. In any event, the conditions must be maintained such that the pH of the meat agglomerates is reduced to below about 4.2. The cooking and acidification is accomplished simply by submerging the surface coagulated or denatured meat agglomerates in a hot acid solution for an appropriate period of time. Preferably the denaturing bath into which the agglomerates are dropped also is used for cooking and acidifying the meat pieces. Any organic or inorganic acid that is food compatible can be used in the acid bath including, for example, such inorganic acids as hydrochloric acid and phosphoric acid and such organic acids as acetic acid, succinic acid, lactic acid, fumaric acid, citric acid, maleic acid, tartaric acid and the like. Applicants prefer citric acid.

Typically, the temperature of the hot acid solution is in the range of about 180° to 215° F., preferably between about 210° to 212° F. and most preferably at its boiling point. The pH of the acid solution preferably is maintained between about 2.8 and 3.3. When using an aqueous citric acid bath, for example, a 3 to 7% concentration of citric acid is suitable. Generally, for the desired agglomerate size, the time of contact between the extruded meat agglomerates and the acid bath will be on the order of about 15 minutes to about 30 minutes. Typically, a retention time of about 20 minutes is sufficient to cook and acidify the meat agglomerates. Most of the time spent in the acid bath is for acidifying the agglomerates since cooking typically is completed in the first 3-7 minutes. If a more strongly acidic bath is used, the time required for treatment may be reduced somewhat.

Preferably, both the denaturing and the acidifying baths also are agitated to further enhance the generation of randomized meat agglomerates approximating the shape of chopped meat chunks.

The acidified agglomerates removed from the hot acid bath are suitable for direct inclusion in a hot fill, high acid liquid product such as spaghetti sauce and the like. The agglomerates could also be refrigerated prior to use. Preferably, however, the acidified meat agglomerates are quick frozen so that they can be readily handled, stored and used as desired. Any conventional process for quick freezing small pieces of food can be used. For example, the conventional process of individual quick freezing wherein the individual food pieces are drenched in a stream of liquid carbon dioxide is particularly useful. Other procedures for individually and rapidly freezing the meat agglomerates will be apparent to those skilled in the art.

The acidified meat agglomerates then are sized by conventional screening techniques so that pieces smaller than about 0.25 inch are removed and recirculated to the extrusion step; while pieces larger than about 1.25 inches are subdivided into smaller pieces and returned to the screening operation. As noted above, most of the meat pieces preferably have a thickness of about 0.5 inch or greater and desirably have a distribution within a range of agglomerate particle sizes between about ¼ inch to about 1¼ inch, preferably about 0.5 to about 0.75 inch.

The so-prepared acidified agglomerated meat pieces can be blended with a variety of high acid liquid products such as sauces and gravies. A spaghetti sauce product containing the meat chunks is specifically contemplated. Such liquid food products exhibit an acidic pH below about 4.6, typically below about 4.2. As previously described, these products are subjected to a relatively mild heat treatment simply to destroy acid tolerant microorganisms before packaging. Because of the high acid character of such food products, high temperature processing is not required and indeed is to be avoided because it impairs the organoleptic character of the food product. The proliferation of other spoilage-causing and toxin-forming organisms is inhibited by the relatively high acidity level of the product. The present invention provides a way for introducing large sized meat pieces having the appearance and texture of freshly cooked meat chunks into such high acid liquid products.

The following Examples are provided to further illustrate the present invention without acting as a limitation upon its scope.

EXAMPLE 1

A meat mixture was prepared by blending 1000 pounds of coarsely ground beef (approximately one-half inch pieces); 40 pounds of salt (sodium chloride); and 3 pounds of sodium tripolyphosphate (while this additive enhances binding its use generally is optional). The ingredients were mixed in a ribbon blender for five minutes, with the temperature maintained in the range of 26°–30° F. After mixing the meat mixture was further ground in a Weiler grinder using a one-eighth inch die plate.

The so-prepared meat paste was collected and held refrigerated for 60 to 90 minutes until the salt-soluble proteins had sufficiently solubilized before further processing. The meat paste temperature was maintained in the 26°–30° F. range during this hold time.

After the hold period the meat paste was formed into agglomerates using the Marlen extrusion device described above. The meat paste was pumped at a rate of approximately 100 pounds per minute through the extrusion plate, with blades rotating at 500 R.P.M. and steam injection pressure was set at 18 p.s.i.g. The die plate used was one-half inch thick. The diameter of each hole in die plate was also one-half inch.

Meat agglomerates (nuggets) averaging about one-half inch in maximum dimension fell from die plate into a boiling 3.5% citric acid solution. The citric acid bath provided the dual functions of coagulating (surface denaturing) and acidifying the meat agglomerates. The agglomerates fell a distance of between about 26 inches and about 40 inches from the die plate to the acid bath.

As noted above, the size and shape of the agglomerate is determined inter alia by the rate of meat flow through the system, the speed of the blades, injection steam pressure, the thickness of die plate, and the distance of free fall to the kettle. Free fall introduces gravitational effects on the extruded agglomerates to give an irregular, oval appearance.

Once the kettle was full with the meat agglomerates (approximately 300 pounds in 85 gallons of solution), the agglomerates were cooked for 15–25 minutes with constant stirring until a pH below about 4.10 was achieved, e.g. a pH of 3.9. After cooking, the cooked and acidified meat agglomerates were removed from the acidic solution, drained, and individually quick frozen. The product can be stored in frozen state until it is used in a final product (e.g., spagetti sauce).

EXAMPLE 2

In this Example, the effect of injection steam pressure on the size of the extruded agglomerates was explored. The same meat paste described in connection with Example 1 was used. The blade of the extruder was rotated at 500 R.P.M. and other conditions were held the same. The data presented in Table 1 were obtained.

TABLE 1

| Steam Pressure (psig) | Average Agglomeral Length (inches) |
|---|---|
| 0 | 6.00 |
| 15 | 1.25 |
| 18 | 0.50 |

As shown, when extruding a meat paste made from beef, salt and sodium tripolyphosphate, the use of steam injection is important to obtain the desired agglomerate size.

While the present invention has been described with respect to preferred embodiments, it should be understood that various changes may be made without departing from the spirit and scope of the invention as particularly claimed below.

We claim:

1. A process for preparing acidified meat agglomerates to be included in a heat treated, though unsterilized, acidic liquid food product comprising:
   (a) grinding meat in the presence of added protein-solubilizing salt to produce a meat paste;
   (b) extruding discrete agglomerates of the meat paste into a hot aqueous protein denaturing bath so as to coagulate at least the surface proteins of said discrete agglomerates, said agglomerates comprising particles having a size within the range of about 0.25 to about 1.25 inch; and (c) soaking the surface-coagulated agglomerates in a hot aqueous bath containing an edible acid for a time sufficient to permeate the agglomerates with the acid and reduce the pH of said agglomerates to less than about 4.6, said acid bath containing a sufficient concentration of acid for reducing the pH of said agglomerates to less than about 4.6.

2. The process of claim 1 wherein the hot aqueous protein denaturing bath is a hot aqueous bath containing an edible acid.

3. The process of claim 1 wherein said agglomerates comprise particles having a size greater than 0.5 inch.

4. The process of claim 3 wherein said salt is sodium chloride and is added in an amount between about 1% and about 6% by weight of the meat.

5. The process of claim 4 wherein said salt also includes sodium tripolyphosphate in an amount between about 0.1% and about 1.0% by weight of the meat.

6. The process of claim 5 wherein said meat is beef.

7. A shelf stable, heat treated, though unsterilized, packaged tomato-based liquid food product having a pH of less than about 4.6 comprising an acidic tomato-base liquid phase containing discrete meat agglomerates having a size greater than 0.5 inch and up to 1.25 inch wherein all of said meat agglomerates have a pH of less than about 4.6 and have been produced by the process of claim 4.

8. The process of claim 3 wherein said meat is veal.

9. A shelf stable, heat treated, though unsterilized, packaged tomato-based liquid food product having a pH of less than about 4.6 comprising an acidic tomato-based liquid phase containing discrete meat agglomerates having a size greater than 0.5 inch and up to 1.25 inch wherein all of said meat agglomerates have a pH of less than about 4.6 and have been produced by the process of claim 8.

10. A shelf stable, heat treated, though unsterilized, packaged liquid food product having a pH of less than about 4.5 comprising an acidic liquid phase containing discrete meat agglomerates having a size greater than 0.5 inch and up to 1.25 inch wherein all of said meat agglomerates have a pH of less than about 4.6 and have been produced by the process of claim 3.

11. The process of claim 1 wherein said soaking is conducted for a time sufficient to reduce the pH of said agglomerates to less than about 4.1.

12. A process for preparing acidified meat agglomerates having the appearance of freshly cooked meat chunks to be included in a heat treated, though unsterilized, acidic liquid food product comprising:
(a) grinding meat in the presence of added protein-solubilizing salt to produce a meat paste;
(b) forming discrete agglomerates of the meat paste by extrusion;
(c) dropping said extruded agglomerates into a hot aqueous protein denaturing bath to deform the extruded agglomerates and then coagulate at least the surface proteins of said discrete agglomerates and fix said agglomerates in the shape created by impacting the denaturing bath, said agglomerates comprising particles having a size within the range of about 0.25 to about 1.25 inch; and
(d) soaking the surface-coagulated agglomerates in a hot aqueous bath containing an edible acid for a time sufficient to permeate the agglomerates with the acid and reduce the pH of said agglomerates to less than about 4.6, said acid bath containing a sufficient concentration of acid for reducing the pH of said agglomerates to less than about 4.6.

13. The process of claim 12 wherein said salt is sodium chloride and is added in an amount between about 1% and about 6% by weight of the meat.

14. The process of claim 13 wherein said meat is veal.

15. The process of claim 12 wherein steam is used during the extrusion step (b) to assist the forming of said agglomerates.

16. The process of claim 15 wherein said meat is beef.

17. The process of claim 16 wherein said salt is sodium chloride and is added in an amount between about 1% and about 6% by weight of the meat.

18. The process of claim 17 wherein said salt also includes sodium tripolyphosphate in an amount between about 0.1% and 1.0% by weight of said meat.

19. The process of claim 12 wherein said agglomerates are dropped from a height of about 20 to about 50 inches.

20. The process of claim 12 wherein the hot aqueous protein denaturing bath is a hot aqueous bath containing an edible acid.

* * * * *